US012753031B2

(12) United States Patent
Ben Ichay

(10) Patent No.: US 12,753,031 B2
(45) Date of Patent: Oct. 6, 2026

(54) PRINTER LOADING AND FEEDING

(71) Applicant: Kornit Digital Ltd., Rosh HaAyin (IL)

(72) Inventor: Zvi Ben Ichay, Rehovot (IL)

(73) Assignee: Kornit Digital Ltd., Rosh HaAyin (IL)

( * ) Notice: Subject to any disclaimer, the term of this patent is extended or adjusted under 35 U.S.C. 154(b) by 155 days.

(21) Appl. No.: 18/702,848

(22) PCT Filed: Oct. 21, 2022

(86) PCT No.: PCT/IL2022/051116
§ 371 (c)(1),
(2) Date: Apr. 19, 2024

(87) PCT Pub. No.: WO2023/067607
PCT Pub. Date: Apr. 27, 2023

(65) Prior Publication Data

US 2024/0417199 A1 Dec. 19, 2024

Related U.S. Application Data

(60) Provisional application No. 63/270,140, filed on Oct. 21, 2021.

(51) Int. Cl.
*B41J 3/407* (2006.01)
*B41J 11/06* (2006.01)
*B65H 5/04* (2006.01)

(52) U.S. Cl.
CPC .............. *B65H 5/04* (2013.01); *B41J 3/4078* (2013.01); *B41J 11/06* (2013.01); *B65H 2701/174* (2013.01)

(58) Field of Classification Search
CPC ..................................................... B41J 3/4078
See application file for complete search history.

(56) References Cited

U.S. PATENT DOCUMENTS

| | | | |
|---|---|---|---|
| 2012/0040148 | A1 | 2/2012 | Mozel |
| 2013/0293652 | A1 | 11/2013 | Spence et al. |
| 2018/0339510 | A1 | 11/2018 | Ben-Zur |
| 2019/0299663 | A1 | 10/2019 | Takagiwa |
| 2019/0381808 | A1 | 12/2019 | Friedrich et al. |

(Continued)

FOREIGN PATENT DOCUMENTS

| | | |
|---|---|---|
| CN | 102582244 | 7/2012 |
| WO | WO 2020/025130 | 2/2020 |

(Continued)

OTHER PUBLICATIONS

Supplementary European Search Report and the European Search Opinion Dated Aug. 6, 2025 From the European Patent Office Re. Application No. 22883118.6. (12 Pages).

(Continued)

*Primary Examiner* — Scott A Richmond

(57) ABSTRACT

A loading and printing system for textile printing, carrying textile from a loading station to a printing area, has a loading path including at least one loading station, and a printing path with at least one printing functional unit for carrying out a printing function on the textile. The loading path and printing path are separate and mutually disconnected and the loading path may provide pallets loaded with the textile to the printing pallet path as needed and receive the loaded pallets in return after printing.

24 Claims, 9 Drawing Sheets

(56) References Cited

U.S. PATENT DOCUMENTS

| | | | |
|---|---|---|---|
| 2019/0389229 A1 | 12/2019 | Zocco et al. | |
| 2021/0198062 A1 | 7/2021 | Mizuno et al. | |
| 2021/0198063 A1* | 7/2021 | Mizuno | B41J 3/4078 |

FOREIGN PATENT DOCUMENTS

| | | |
|---|---|---|
| WO | WO 2021/132448 | 7/2021 |
| WO | WO 2023/067607 | 4/2023 |

OTHER PUBLICATIONS

International Search Report and the Written Opinion Dated Jan. 19, 2023 From the International Searching Authority Re. Application No. PCT/IL2022/051116. (13 Pages).

* cited by examiner

PRINTER LOADING AND FEEDING

RELATED APPLICATIONS

This application is a National Phase of PCT Patent Application No. PCT/IL2022/051116 having International filing date of Oct. 21, 2022, which claims the benefit of priority under 35 USC § 119 (e) of U.S. Provisional Patent Application No. 63/270,140 filed on Oct. 21, 2021. The contents of the above applications are all incorporated by reference as if fully set forth herein in their entirety.

FIELD AND BACKGROUND OF THE INVENTION

The present invention, in some embodiments thereof, relates to a method and apparatus for printer loading and feeding and, more particularly, but not exclusively, to a printer for textile printing, including a garment printer.

Nowadays feeding and loading of a garment printer may use any of the following three systems.

In one system, there is a loading station at one end of the printer, and one or more pallets may be loaded with a garment at a loading/unloading station. There are printers which have two parallel tracks or paths and two loading stations, one for each track, so that as the pallet on one track is being printed, the other may be loaded, thereby minimizing down time. A matrix type printer may have several such tracks and several different print heads or heads for associated operations. In both cases, the pallet moves back and forth along the track between the loading station and the printing zone. The system is mainly relevant to inkjet printing but may also be used for screen printing.

A second system is the oval or cyclical screen printer—In such a system one or more pallets move in a closed loop path from one printing station to the next and returns to the loading station after having visited all the intermediate stations.

A variation of the closed loop system is to have separate loading and unloading stations in different positions. The pallet may be stationary while being operated on at each individual station, and there may be multiple stations, one for each color, drying stations and the like.

In a variation of the linear option there may be a dedicated return track for the pallets, say at a different level from the forward track. The return track may be at a different level, say underneath, and after unloading, the pallet may return on the return path back to the loading station.

In the current systems, the printing process and the loading process are connected. Thus if a pallet is held up at a particular station that takes longer than all the rest, all the pallets are held up and thus the throughput is set by the slowest station. The problem can be mitigated by adding extra pallets, so that there is a pallet to load even if a station is taking too long, but each extra pallet may involve an extra motor in the system. In addition, some printing processes may require a pallet to return to an earlier station. In most modern printers, looping is not provided for and the pallet has to go around the entire rail again. But even if looping were possible, the entire rail would then be held up by the looping process and no pallets would be able to advance to the first station in the loop until the previous pallet has completed the loop.

However, delays may also be due to the loading and unloading process, so that as long as the loading and printing processes are connected, a delay in either may lead to a delay in the process.

Often, printing processes involve multiple stages or stations—in some case the printing process is more than just one process—a printing operation may involve pretreatment, drying, heat pressing, separate stations for different colors, a station for a white underbase, special effects etc. Thus, there may be printing operations that do not use all of the stations. Accordingly if a given printing operation is the only one that requires a given station, all other pallets have to wait their turn.

As a general point there is no option of any kind of buffer or buffering between the loading part and printing part in the current configurations. It is possible to add an additional loading station, but that merely moves the bottleneck to the printing process, and it is not possible to separate loading from printing so that any single bottleneck affects them both.

SUMMARY OF THE INVENTION

The present embodiments may provide a first path or axis on which loading of garments, trays or pallets for printing takes place and one or more printing paths on which the actual printing and/or associated operations takes place, garments/pallets being fed from the loading path to the printing path or paths so that loading and printing are disconnected and thus do not interfere with each other. Accordingly, bottlenecks in one or other of the printing, loading, and unloading processes may become independent. The printing, loading, and unloading paths may be perpendicular to each other, or may be in a closed loop.

According to an aspect of some embodiments of the present invention there is provided a loading and printing system for textile printing, carrying textile from a loading station to a printing area, the system comprising:

a first, loading, path including at least one loading station;

at least one printing path, the printing path associated with at least one printing functional unit for carrying out a printing function on the textile, the loading path thereby to provide loaded textiles to the printing path as needed;

There may be provided one or more unloading stations and the loading station may in some embodiments also be an unloading station.

The textiles are typically loaded and transported on pallets, but alternatively the textiles may be transported as standalone items.

In an embodiment, the textile printing is garment printing.

Embodiments may comprise a plurality of printing paths, each fed by the loading path.

In an embodiment, a respective printing path comprises a plurality of printing functional units.

Embodiments may comprise a plurality of printing paths, each path introducing a respective delay to carry out a printing function of a respective printing functional unit.

In an embodiment, at least some of the respective delays differ.

In an embodiment, adjacent printing paths share printing functional units, the shared printing functional units being mounted to operate with garments moving along the printing paths.

In an embodiment, the loading, and unloading paths on the one hand and printing paths on the other hand are mutually positioned to allow handover of the garments or the pallets between them.

Embodiments may comprise a controller for sending a respective pallet to a designated sequence of printing paths either synchronized or not synchronized with each other.

In an embodiment, the designated sequence comprises sending the respective pallet more than once to at least one of the printing paths.

In an embodiment, the at least one printing path comprises a closed loop.

In an embodiment, the loading path is configured to receive the pallets in return after printing.

Embodiments may include at least one further unloading path to receive the loaded pallets after printing.

Embodiments may comprise at least one further unloading path to receive the textile from the printing path after printing, in which case the loading path receives the pallets unloaded after printing. The pallets may be received either from the back or from the front of the printing path.

Embodiments may comprise a dryer or dryers in the unloading paths, to serve one or more printing paths.

According to a second aspect of the present invention there is provided a loading and printing method for textile printing, using pallets to carry textile from a loading station to a printing area, the method comprising:

loading pallets on a loading path;

transferring the pallets from the loading path to a printing path; carrying out at least one printing function on the textile on the printing path at the printing area; and transferring the pallets back to the loading pallet path after printing.

The method may comprise:

transferring a respective pallet to a second printing path for a printing operation comprising a further printing function;

returning the respective pallet to the loading path;

transferring the respective pallet to a third printing path for a further printing operation; and returning the respective pallet to the loading path.

The method may further comprise:

transferring a respective pallet to a second printing path for a printing operation;

returning the respective pallet to the loading path;

transferring the respective pallet to a further printing path for a second printing operation;

returning the respective pallet to the loading path;

transferring the respective pallet back to the first or the second printing path for a third printing operation; and returning the respective pallet to the loading path.

The method may further comprise:

transferring the respective pallet to an unloading path;

unloading the textile; and returning the respective pallet to the loading path.

The method may further comprise:

transferring the respective pallet to an unloading path after printing, and unloading the textile from the pallet; and returning the respective pallet to the loading path.

The method may further use single or multiple unloading paths and may involve drying the textile on the unloading path or multiple unloading paths and unloading paths may begin at the front or at the back of the printing path.

In the method the printed garments may be transferred between the functional stations on axes, or paths, either as standalone items, or mounted on pallets. For the sake of simplicity, the following description is based on moving pallets, but without limiting the option of moving the garments as standalone items.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
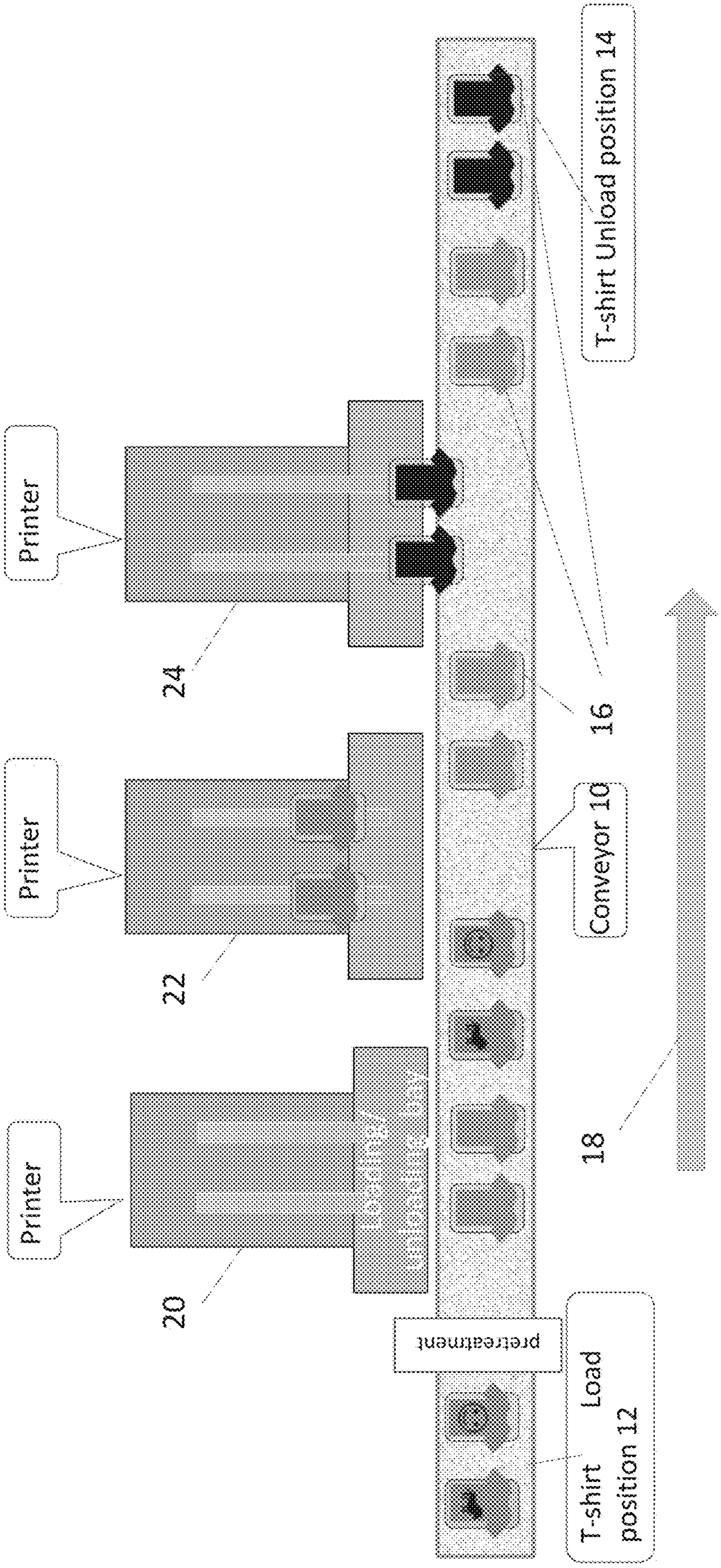
FIG. 1A is a simplified diagram showing a view from above of a loading and printing system for textile printing, using pallets to carry garments loaded at a loading station for printing, and delivered to an unloading station for retrieval after printing, according to a first embodiment of the present invention.

As related above, the present invention, in some embodiments thereof, relates to a method and apparatus for printer loading and feeding and, more particularly, but not exclusively, to a printer for textile printing, including a garment printer.

In the method the printed garments may be transferred between the functional stations on axes, or paths, either as standalone items, or mounted on pallets. For the sake of simplicity, the following description is based on moving pallets, but without limiting the option of moving the garments as-is.

The present embodiments provide two axes or paths on which the pallets travel, a loading axis and a printing axis. Pallets are loaded and unloaded at either end of the loading axis and then are conveyed along the loading axis to be picked up by the printing axes. As there is more than one printing axis, a bottleneck on one printing axis has no effect on other printing axes, and a printing axis with a faster throughput simply picks up pallets at a faster rate from the loading axis. The slower printing axis picks up pallets at a slower rate and should a faster axis suddenly become slower, say it finds itself using an extra process for a particular print job, then it simply waits longer before taking its next pallet without any effect on the rest of the line. Thus the embodiments provide a disconnect between loading and unloading operations on the one hand and the printing functions on the other hand. That is to say, loading and unloading operations are disconnected from the printing operations, and the loading axis may act as a buffer to overcome the different delays, hence ensuring maximum utilization of the printing axes as these are the most expensive resource of the printers.

The present embodiments may thus provide a loading, unloading, and printing system for a textile printer that uses pallets (or any other conveying options for the printed media) to carry textile from a loading station to a printing area and from a printing area to an unloading station.

A loading pallet path, including a loading station, possibly more than one loading station extends along a first axis.

A second axis, that may be perpendicular to the first axis, provides a printing path in which pallets travel between printing functional units for carrying out a printing function on the textile. By "printing functional unit" is meant units that carry out any of a number of functions involved in the printing process including providing pretreatment fluids, post treatment fluids, drying (partial or full), ironing, and printing different colors. Typically a single path may include multiple printing functional units. Likewise, adjacent printing paths may share printing functional units.

Alternatively, the printing path may be a closed loop with return path.

In embodiments, there are two or more printing paths. All printing paths may include all printing functional units. In other embodiments, different paths may have different units.

In embodiments, the loading and/or unloading paths may be used to perform one or more functions of the printing process, such as pretreatment of the fabric (on the loading path), or curing of the print (on the unloading path), etc.

The system ensures that the loading path provides loaded pallets to the printing paths as needed and the unloading path receives the loaded pallets in return after printing. The use of separate loading, unloading and printing paths ensures that the loading and printing operations are mutually disconnected, so that the slowest printing function does not form a bottleneck to the entire process and its utilization is maximized. Rather the loading path provides a buffer of loaded pallets for the printing functions, and the different printing paths take loaded pallets from the buffer as needed. A printed pallet may then be directed to an unloading bay for unloading. In other embodiments the printed pallet may be sent to a different printing path for a treatment only available on the latter path. In embodiments, a given tray may visit a particular printing path more than once to ensure that it is treated with appropriate printing functions in a required order.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1A illustrates a simplified embodiment of a printer system according to the present invention. A conveyor 10 leads from a loading station 12 to an unloading station 14 along a first axis. T-shirts, or other garments as appropriate, are loaded onto pallets at the loading station and the pallets travel along the conveyor 10. Reference numeral 16 refers to T-shirts loaded onto and carried by pallets. Reference numeral 18 indicates the direction of travel of the conveyor 10.

In the embodiment as illustrated, there are three printers, 20, 22 and 24 each with dual rails for carrying pallets. In some cases each printer may carry out a different part of the printing process and in other cases all printers do all printing operations required, and simply provide additional throughput. The printers pick up pallets from the conveyor 10 as and when each rail becomes available. There may be a robot arm or plunger or the like to transfer the pallets from the conveyor 10 to the printing rail. Different T-shirts may require different combinations of the available printers, and a computerized system may ensure that each pallet is sent to each required printer.

In particular, the different printers may carry out operations at different rates. For example one machine might be an inkjet printer that prints a white undercoat. The second machine might be a color inkjet printer that prints a color image and the third machine might be an applicator that applies decoration to the printed image. The third machine might thus be considerably slower than the others, making synchronization impossible. If the machines were placed one after the other, the third machine would slow the entire line. However according to the present embodiments the loading and unloading is disconnected from the processing, and the conveyor serves as a buffer to compensate for different rates in different parts of the process.

Accordingly, an operator may load a garment onto a pallet whenever there is a pallet in the loading station, irrespective of what the printers are doing.

By contrast, in the current art, the printing path and the loading path are the same, and all the pallets are held up by any bottlenecks in the process. In the present embodiments, the conveyor acts as a buffer and loading may move ahead while the printers are being slow, and by the same token, short term speeding up of the printers may take up shirts from the buffer so that loading and unloading may continue at the same rate.

Accordingly, if a station does not work or stops work, the conveyor continues as before and continues to feed the still operational printers without interruption. Likewise, if a station needs to be stopped for repair or maintenance, the rest of the system continues to operate as before, and only the print rail requiring repair or maintenance need be stopped.

Furthermore the computerized control may determine what functions have been lost by the shutdown and may ensure that print jobs requiring currently unavailable functions are rescheduled.

The present embodiments may include a linear conveyor and one or more loading stations to feed multiple printers. The conveyors may be passive and drawn along the conveyor.

In another embodiment the conveyor is in fact a rail and each pallet has a motor and moves independently.

The printing system may be a closed loop with stations around. In this case a separate conveyor may feed the closed loop with prepared pallets. Such a separate conveyor may feed more than one closed loop.

Figure 1B:
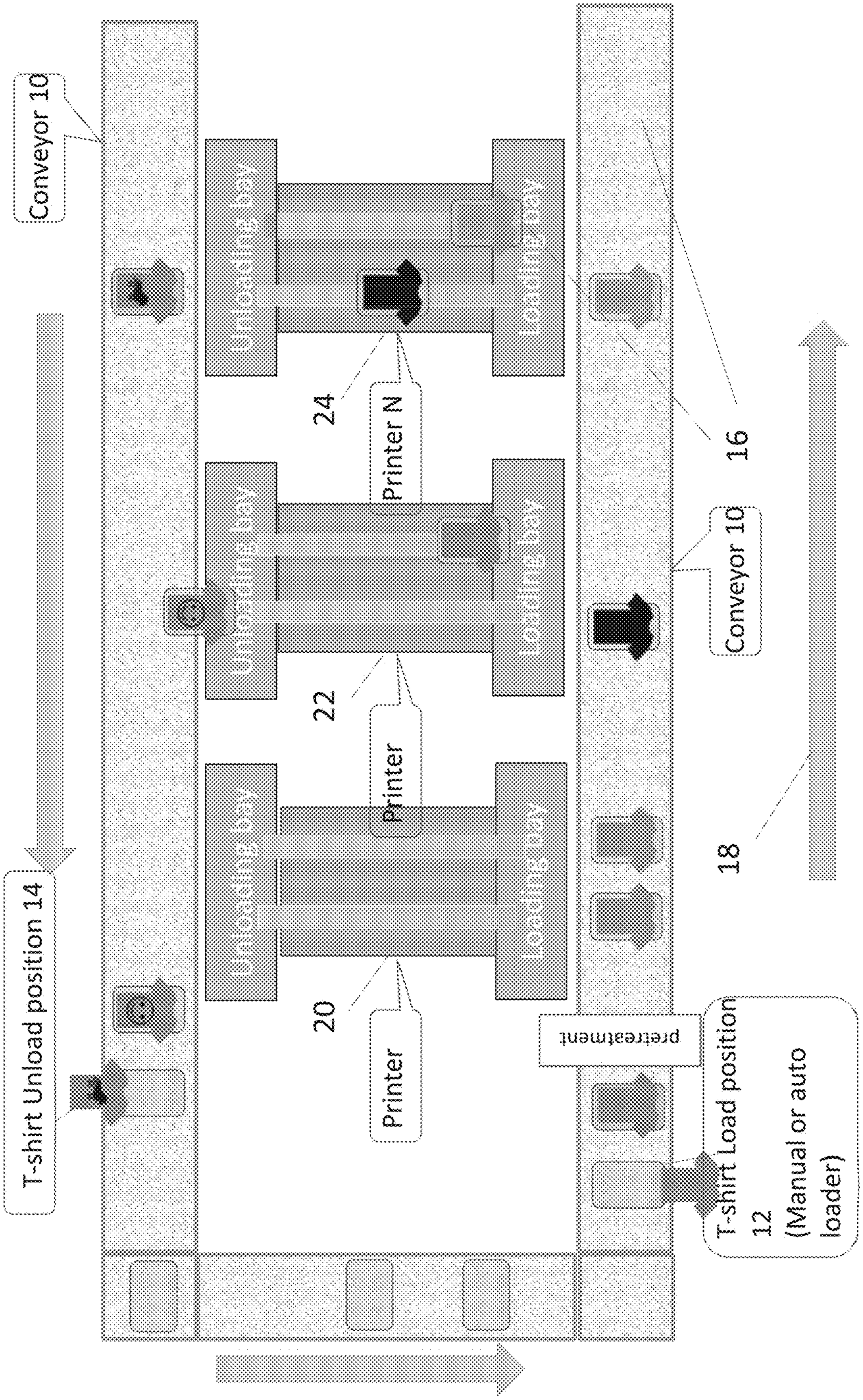
FIG. 1B is a simplified diagram showing a view from above of a loading and printing system for textile printing, using pallets to carry garments loaded at a loading station for printing, and delivered to the opposite side of the printer after printing, to another caring path for unloading.

Reference is now made to FIG. 1B, which illustrates a variation of the loading and printing system of FIG. 1A. As before, conveyor 10 leads from a loading station 12 along a first axis to three printing functional units, for example printers, 20, 22 and 24. T-shirts, or other garments as appropriate, are loaded onto pallets at the loading station and the pallets travel along the conveyor 10. Reference numeral 16 refers to T-shirts loaded onto and carried by pallets. Reference numeral 18 indicates the direction of travel of the conveyor 10.

In the embodiment as illustrated, there are three printers, 20, 22 and 24 each with dual rails for carrying pallets. In some cases each printer may carry out a different part of the printing process and in other cases all printers do all printing operations required, and simply provide additional throughput. The printers pick up pallets from the conveyor 10 as and when each rail becomes available. There may be a robot arm or plunger or the like to transfer the pallets from the conveyor 10 to the printing rail. Different T-shirts may require different combinations of the available printers, and a computerized system may ensure that each pallet is sent to each required printer.

The pallets are then unloaded from the printing functional units at the far side onto unloading path 11 at the opposite side of the printing functional unit. Unloading path 11 may also comprise a conveyor and the unloading path is thus separate both from the loading path and from the processing paths. Pallets may in one embodiment fall or slide onto the unloading path, and in another embodiment may be grabbed by a hook or grapple and pulled onto the unloading path. The unloading path 11 conveys the pallets to unloading position 14 where the shirts are unloading, along the direction of arrow 15, so the unloading is made in a separated path and conveyor that carry the pallet to a unloading position—14. Finally the empty pallets 17 are returned along a return path 19 in the direction of arrow 21, back to the loading position 12.

Figure 1C:
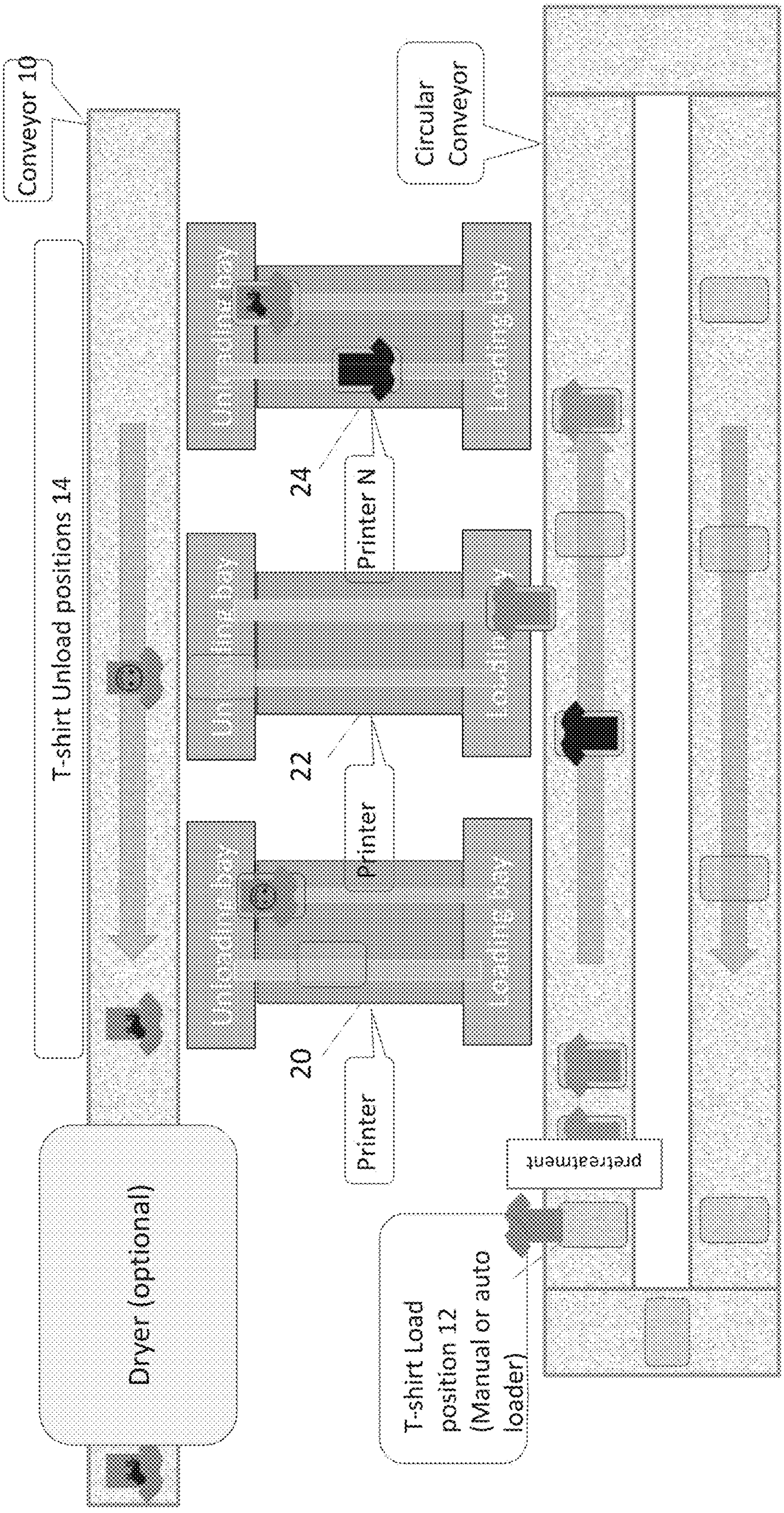
FIG. 1C is a simplified diagram showing a view from above of a loading and printing system for textile printing, using pallets to carry garments loaded at a loading station for printing, and delivered to the opposite side of the printer after printing for unloading the garment to a conveyor for carry the printed garment to optional dryer and/or folding and packaging stations.
Figure 2:
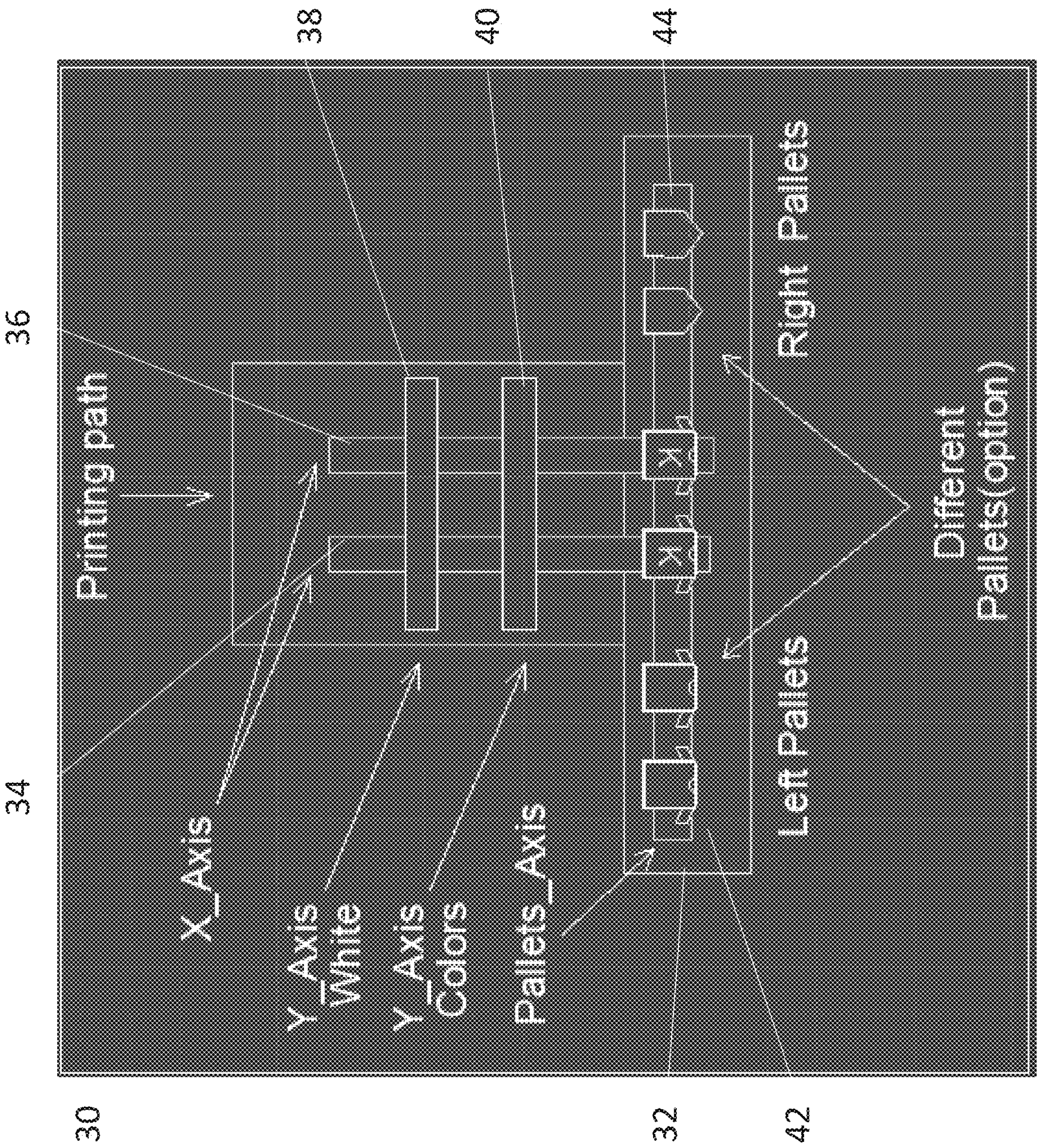
FIG. 2 is a simplified diagram showing a view from above of a second embodiment of the present invention in which pallets carry garments from a loading station via a printing path and back to the original loading station of which there are two.

Reference is now made to FIG. 1C, which differs from FIG. 1B in that there is a closed loop loading path 13 in which a conveyor carries pallets with shirts for printing from loading position 12 to one of the three printing functional units 20, 22 and 24. The pallets are picked up as required by the printers, whether automatically, say pushed by a plunger, or even transferred manually by an operator. The shirts are operated on while on the pallets and transferred to the unloading path 11. The shirts are removed from the pallets and placed on unloading path 11, and the pallets return to the closed loop loading path where they return to the loading point. The unloading path 11 may include finishing units such as dryer 23.

Reference is now made to FIGS. 2-8, which illustrate a loading and printing system 30 according to the present embodiments, in which a loading conveyor 32 feeds two printing rails 34 and 36. The printing rails 34 and 36 are in parallel along a printing X-axis which is at right angles to the conveyor axis. In addition the two printing rails 34 and 36 share two print heads which each run on a printing Y-axis on rails 38 and 40 at right angles to the printing X-axis and indeed parallel to the loading axis. One print head may for example print white and the other print head may print colors.

The conveyor has two loading points 42 and 44 at either end for what are denoted left pallets and right pallets. Optionally the left and right pallets may have different garments or require different processes.

Figure 3:
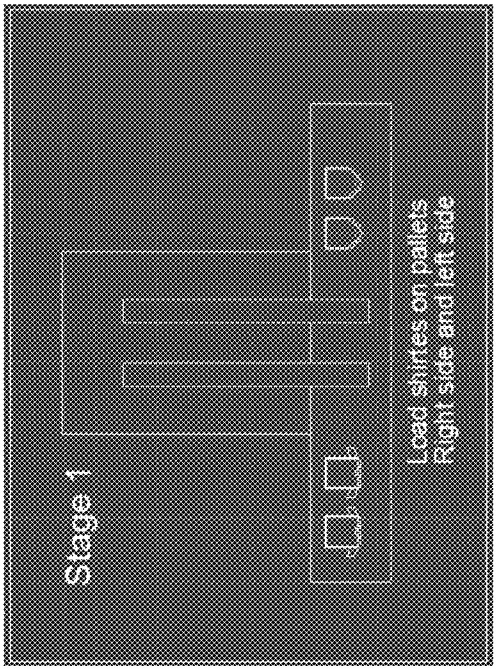
FIGS. 3, 4, 5, 6, 7 and 8 show six different stages of operation of the embodiment of FIG. 2.

As shown in FIG. 3, pallets are loaded at left and right loading stations.

Figure 4:
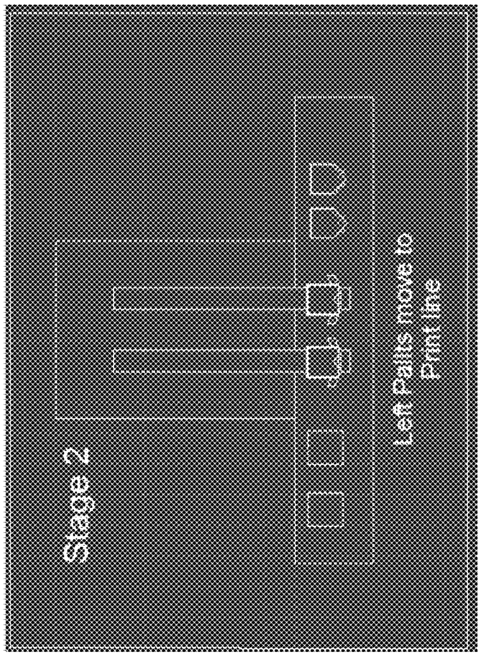
Figure 5:
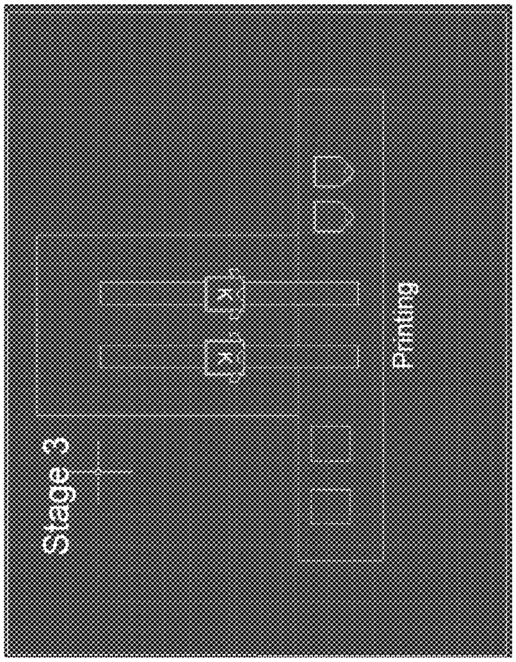
Figure 6:
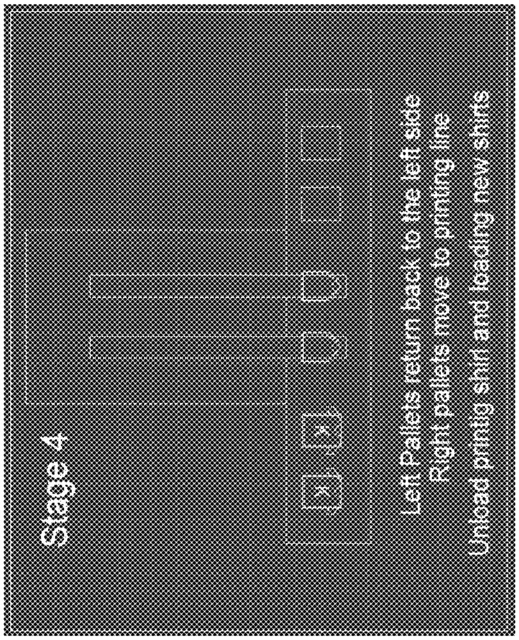
Figure 8:
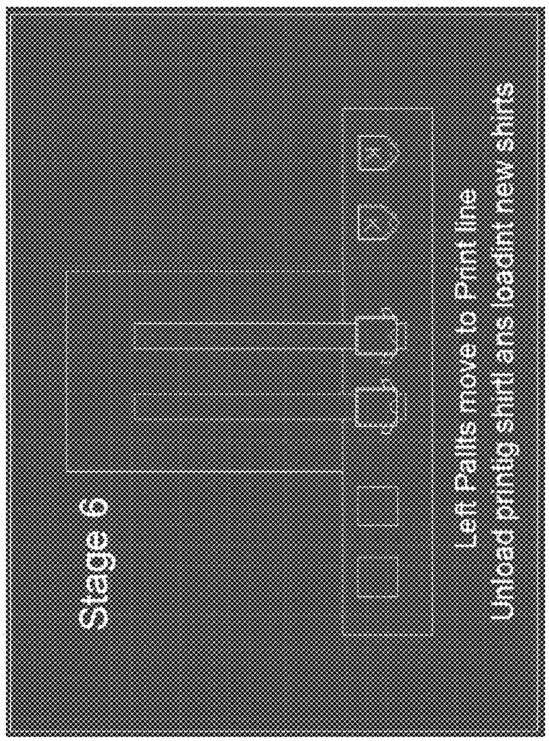
Figure 7:
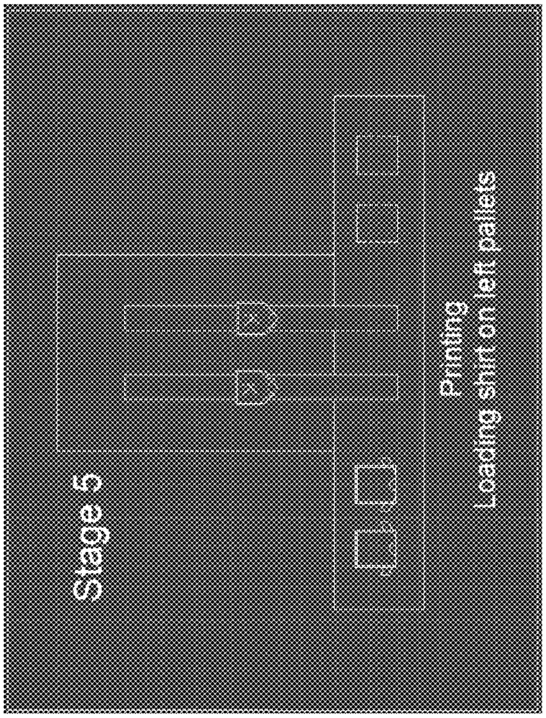

In FIG. 4, the left pallets move towards the printing rails or printing lines and are picked up by the printing rails. In FIG. 5 printing is carried out of the left pallets. In FIG. 6 the left pallets return to the conveyor and back to the left loading station, where they can be unloaded and further shirts loaded. The right pallets then head for the printing line. In FIG. 7, the right pallets are picked up by the two print lines and printed and in FIG. 8 the right pallets are returned to the right loading station.

Figure 9:
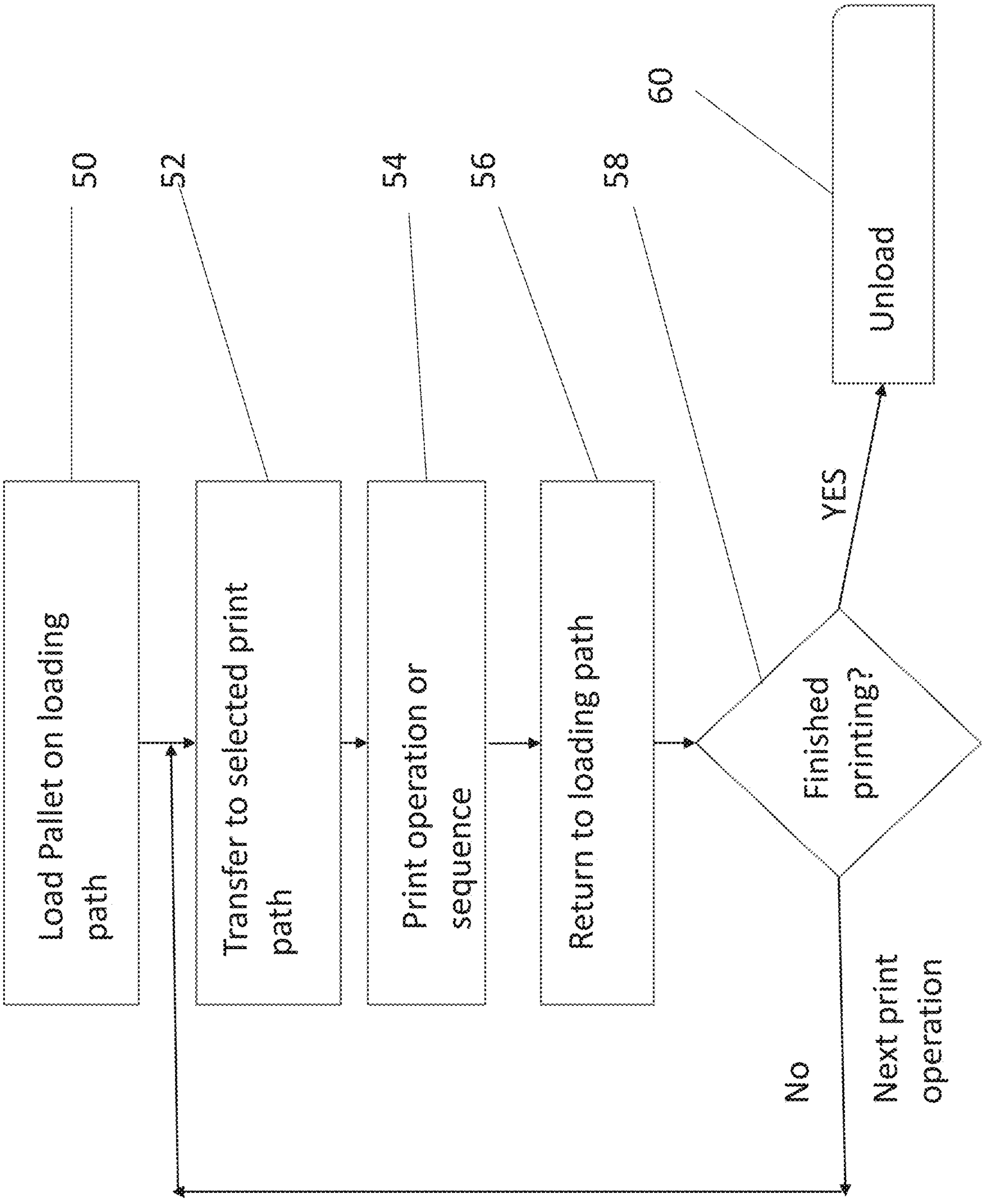
FIG. 9 is a simplified flow chart showing a loading, printing and unloading sequence for a garment, according to embodiments of the present invention.

Reference is now made to FIG. 9, which illustrate a method of printing using the embodiment of FIG. 1A. A pallet is loaded with a garment on the pallet path—50. The print operation indicates that functions are needed on a given print path and the pallet is directed to that print path. In embodiments all functions may be provided on each print path so then it is simply a matter of selecting the available print path. In other embodiments, different print paths may provide different functions, and the functions may not be synchronized. The pallet is transferred to the selected print path along which it travels to the required printing functional unit, for example the pretreatment head—52. The printing function is then carried out. If a sequence of functions is required and is available at the same print path, then the sequence is carried out, say pretreatment, printing a white undercoat, printing color, drying—54. The pallet is then returned to the loading path—56. If printing is complete, 58, then the pallet travels along the loading path to the unloading station and is unloaded 60. However, if further printing operations are required then the pallet is transferred from the loading path on to the next required print path. The loop may be repeated several times until all required printing operations are carried out, and the loop may include returning to previously visited printing paths.

Figure 10:
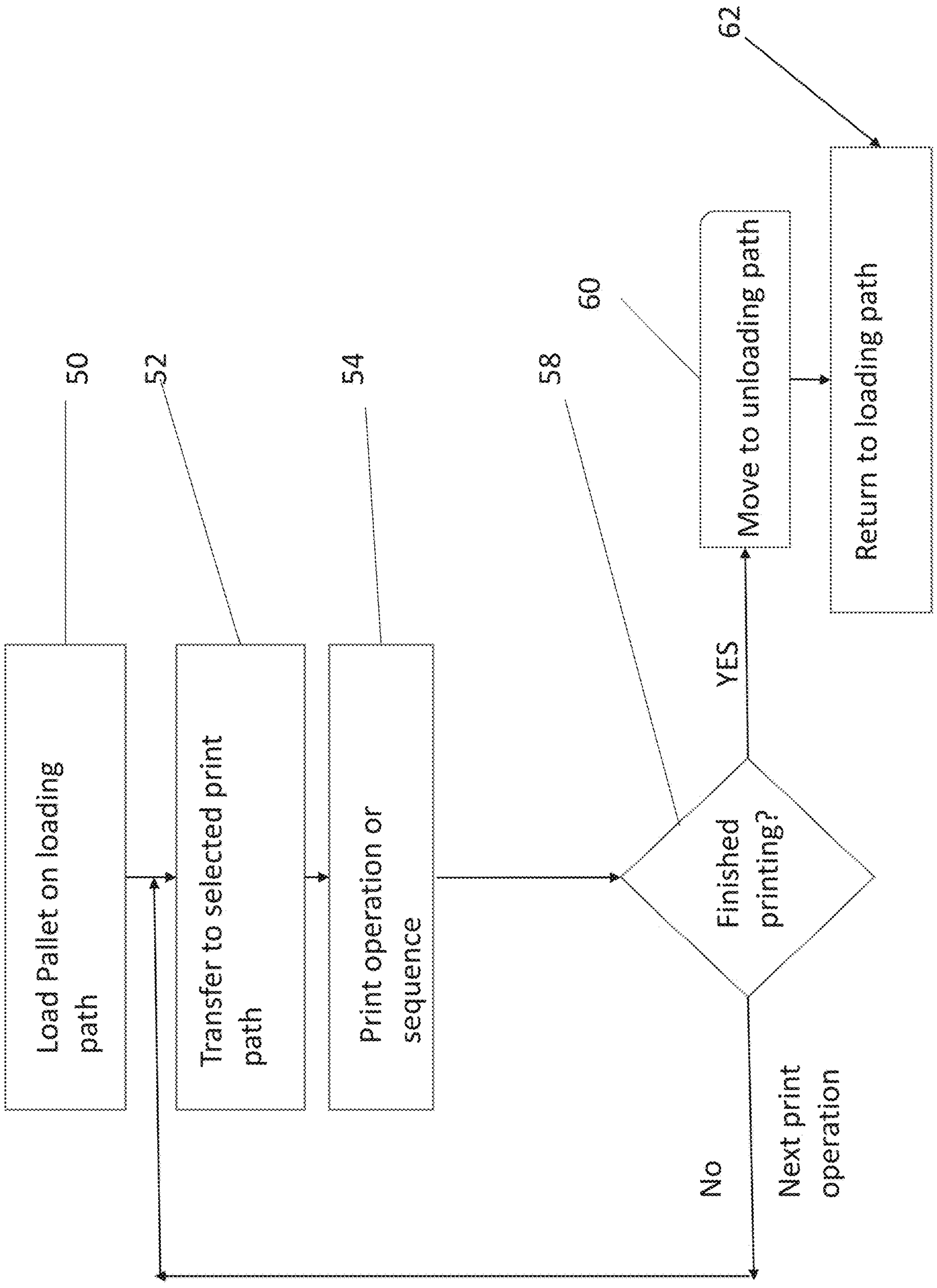
FIG. 10 is a simplified flow chart showing a loading, printing and unloading sequence for a garment, according to further embodiments of the present invention.

Reference is now made to FIG. 10 which is a simplified flow chart illustrating a method of printing using the embodiment of FIG. 1B. A pallet is loaded with a garment on the pallet path—50. The print operation indicates that functions are needed on a given print path and the pallet is directed to that print path. In embodiments all functions may be provided on each print path so then it is simply a matter of selecting the available print path. The pallet is transferred to the selected print path along which it travels to the required printing functional unit, for example the pretreatment head—52. The printing function is then carried out. If a sequence of functions is required and is available at the same print path, then the sequence is carried out, say pretreatment, printing a white undercoat, printing color, drying—54. If printing is complete, 58, then the pallet travels along the unloading path to the unloading station and is unloaded 60, and the pallet returns to loading path—62. However, if further printing operations are required then the pallet with the shirt still on it, is transferred from the loading path on to the next required print path. The loop may be repeated several times until all required printing operations are carried out, and the loop may include returning to previously visited printing paths.

Figure 11:
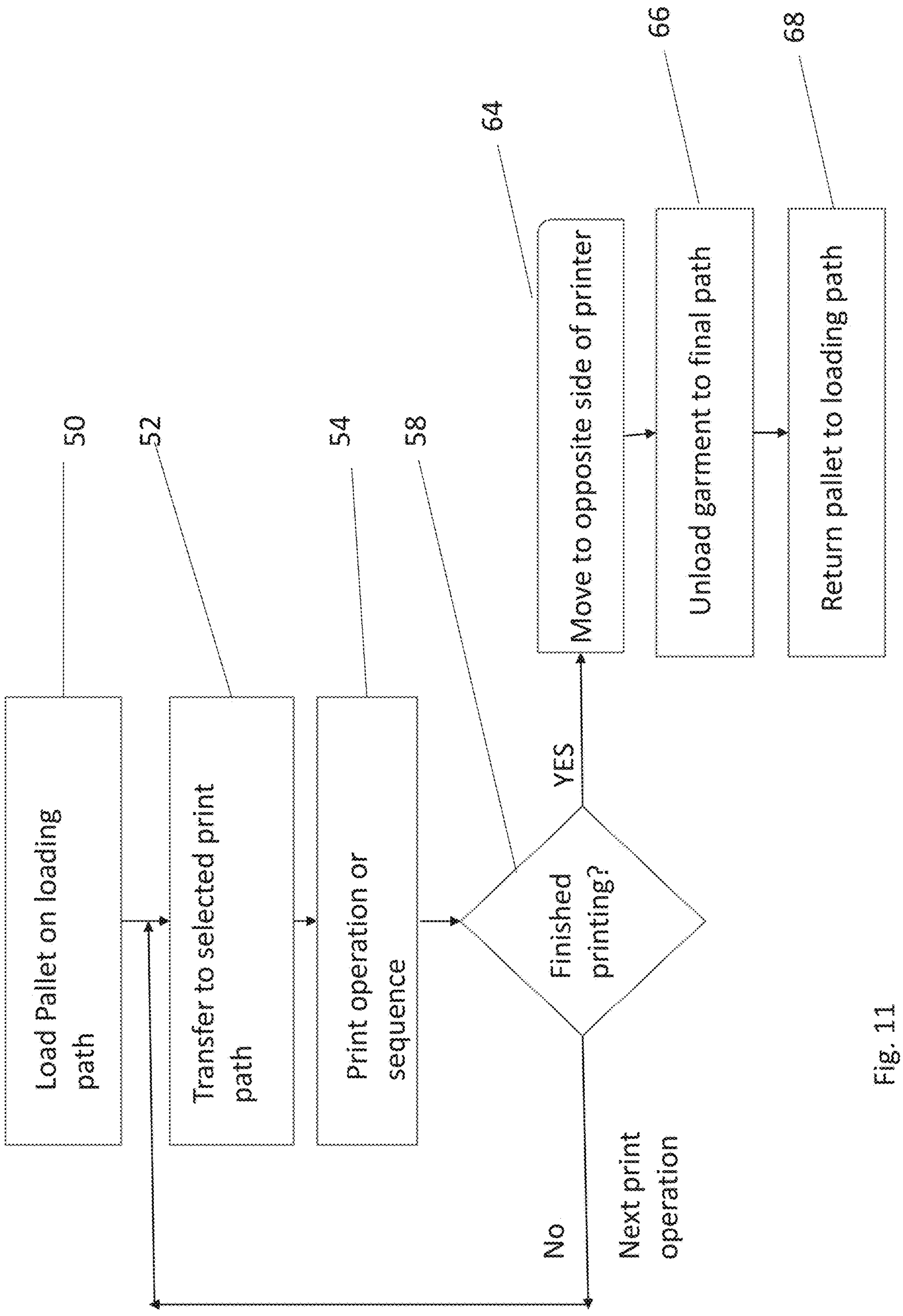
FIG. 11 is a simplified flow chart showing a loading, printing and unloading sequence for a garment, according to yet further embodiments of the present invention

Reference is now made to FIG. 11 which illustrates a method of printing using the embodiment of FIG. 1C. A pallet is loaded with a garment on the pallet path—50. The print operation indicates that functions are needed on a given print path and the pallet is directed to that print path from the pallet path. In embodiments all functions may be provided on each print path so then it is simply a matter of selecting the available print path. The pallet is transferred to the selected print path along which it travels to the required printing functional unit, for example the pretreatment head—52. The printing function is then carried out. If a sequence of functions is required and is available at the same print path, then the sequence is carried out, say pretreatment, printing a white undercoat, printing color, drying—54. If printing is complete, 58, then the pallet travels along to the opposite side of the printing station—64, and the garment is unloaded from the pallet to the unloading path—66, while the pallet returns to the loading path—68. If printing is not complete then the pallet with the shirt may visit other print paths as necessary, and the loop may be repeated several times until all required printing operations are carried out. The loop may include returning to previously visited printing paths.

As explained, the loading path may be on a separate axis from the printing paths. The printing paths may all be on axes, including for example axes which are parallel to each other, but are more generally at any desired and configurable angle to each other.

Alternatively the printing path or paths may be closed loops.

In this disclosure, the terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A loading and printing system for textile printing, using pallets to carry textile from a loading station to a printing area, the system comprising:

a. at least one loading station;

b. at least one loading path associated with said at least one loading station;

c. at least one printing functional unit for carrying out a printing function on the textile;

d. at least one printing path associated with said at least one printing functional unit the at least one loading path thereby to provide loaded pallets to the printing path as needed;

e. a controller;

wherein said controller comprises instructions for sending a respective pallet to a designated sequence of printing paths for maximum utilization of the printing paths.

2. The loading and printing system of claim 1, wherein said textile printing is garment printing.

3. The loading and printing system of claim 1, comprising a plurality of printing paths, each fed by at least one of the said loading paths.

4. The loading and printing system of claim 3, wherein different printing paths share printing functional units, the shared printing functional units being mounted to move with respect to the printing paths.

5. The loading and printing system of claim 1, wherein a respective printing path comprises a plurality of printing functional units.

6. The loading and printing system of claim 1, comprising a plurality of printing paths, each path introducing a respective delay to carry out a printing function of a respective printing functional unit.

7. The loading and printing system of claim 6, wherein at least some of said respective delays differ.

8. The loading and printing system of claim 1, wherein the at least one loading paths on the one hand and printing paths on the other hand are mutually perpendicular.

9. The loading and printing system of claim 1, wherein said designated sequence comprises sending said respective pallet more than once to at least one of said printing paths.

10. The loading and printing system of claim 1, wherein said at least one path comprises a closed loop.

11. The loading and printing system of claim 1, wherein said loading path is configured to receive said pallets in return after printing.

12. The loading and printing system of claim 1, further comprising at least one further unloading path to receive said loaded pallets after printing.

13. The loading and printing system of claim 1, comprising:

at least one further unloading path to receive said textile from said printing path after printing, and wherein said loading path is configured to receive said pallets unloaded after printing.

14. The system of claim 13, further comprising at least one drier in said unloading path.

15. The system of claim 1, wherein a respective loading path comprises at least one printing functional unit.

16. The system of claim 1, wherein said at least one printing functional unit (comprises dual printing paths.

17. The system of claim 1, wherein said printing paths comprise rails configured for picking up said respective pallet from said at least one loading path and return said respective pallet after completing said printing function.

18. The system of claim 1, wherein said system comprises a plurality of printing functional units and each printing functional unit from said plurality of printing functional units is configured to carry out a different part of the printing process.

19. A loading and printing method for textile printing, using pallets to carry textile from a loading station to a printing area, the method comprising:

loading pallets of textile onto at least one loading path;

transferring said pallets from said at least one loading paths to a specific printing path;

carrying out at least one printing function on the textile on said printing path at said printing area;

Wherein said method further comprises:

a. determining a maximum utilization of the system; and b. said transferring said pallets from said at least one loading path to a specific printing path is done according to a best utilization algorithm.

20. The method of claim 19, comprising:

transferring said pallets back to said at least one loading path after printing;

transferring a respective pallet to a second printing path for a printing operation comprising a further printing function;

returning said respective pallet to said at least one loading path;

transferring said respective pallet to a third printing path for a further printing operation; and returning said respective pallet to said at least one loading path.

21. The method of claim 19, comprising:

transferring a respective pallet to a second printing path for a printing operation;

returning said respective pallet to said at least one loading path;

transferring said respective pallet to a further printing path for a second printing operation;

returning said respective pallet to said at least one loading path;

transferring said respective pallet back to said first or said second printing path for a third printing operation; and returning said respective pallet to said at least one loading path.

22. The method of claim 19, comprising:

transferring said respective pallet to an unloading path;

unloading said textile; and returning said respective pallet to said at least one loading path.

23. The method of claim 19, comprising:

transferring said respective pallet to an unloading bay after printing, and unloading said textile from said pallet to an unloading path; and returning said respective pallet to said loading at least one path.

24. The method of claim 23, comprising drying said textile on said unloading path.

* * * * *